United States Patent [19]

Custer

[11] 4,449,363
[45] May 22, 1984

[54] ATMOSPHERIC PRESSURE MOTOR

[76] Inventor: Willard R. Custer, 1905 W. Washington St., Hagerstown, Md. 21740

[21] Appl. No.: 272,103

[22] Filed: Jun. 10, 1981

[51] Int. Cl.³ .............................................. F16D 31/02
[52] U.S. Cl. ........................................ 60/370; 60/371; 60/407; 60/412; 417/328
[58] Field of Search ................. 60/407, 409, 410, 411, 60/412, 369, 370, 371, 379, 397, 325, 398, 699; 91/180, 178, 172, 181; 141/34, 59; 310/15, 17, 20, 80; 417/273, 328, 238

[56] References Cited

U.S. PATENT DOCUMENTS

| | | | |
|---|---|---|---|
| 1,692,761 | 11/1928 | Osser | 310/46 |
| 2,271,570 | 2/1942 | Pardee | 417/273 |
| 3,465,684 | 9/1969 | Moll | 417/328 |
| 4,036,016 | 7/1977 | Aldorfer | 60/407 |
| 4,171,618 | 10/1979 | Aegerter | 60/412 |

Primary Examiner—Robert E. Garrett
Assistant Examiner—John M. Husar
Attorney, Agent, or Firm—Cushman, Darby & Cushman

[57] ABSTRACT

A magnet attracts succeeding sites distributed about the periphery of a disk causing the disk to rotate. The resulting centrifugal force pulls radially outwards a plurality of piston-like weights mounted on the disk lowering the pressure within a housing for the weights and in a vacuum tank to which the housing is communicated via a check valve. When the weights are all the way out, they operate a trip which renders the magnet temporarily ineffective. Springs return the weights back toward the center of the disk. The vacuum tank is communicated to an opposed piston engine via timed valves which alternately communicate the engine cylinders to the vacuum, for oscillating the opposed pistons. A crank shaft connected to these pistons converts the reciprocating motion to rotary motion.

7 Claims, 2 Drawing Figures

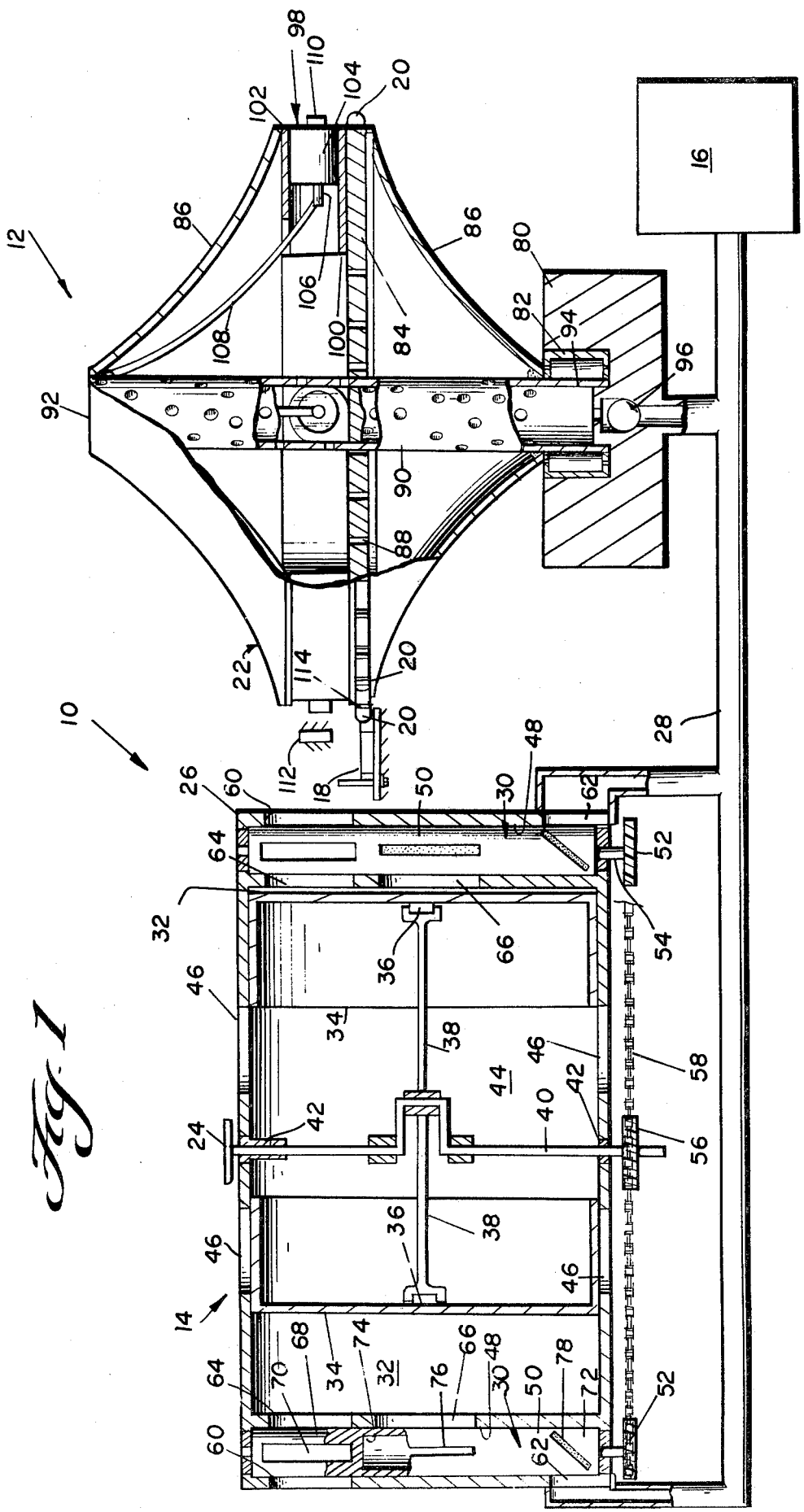

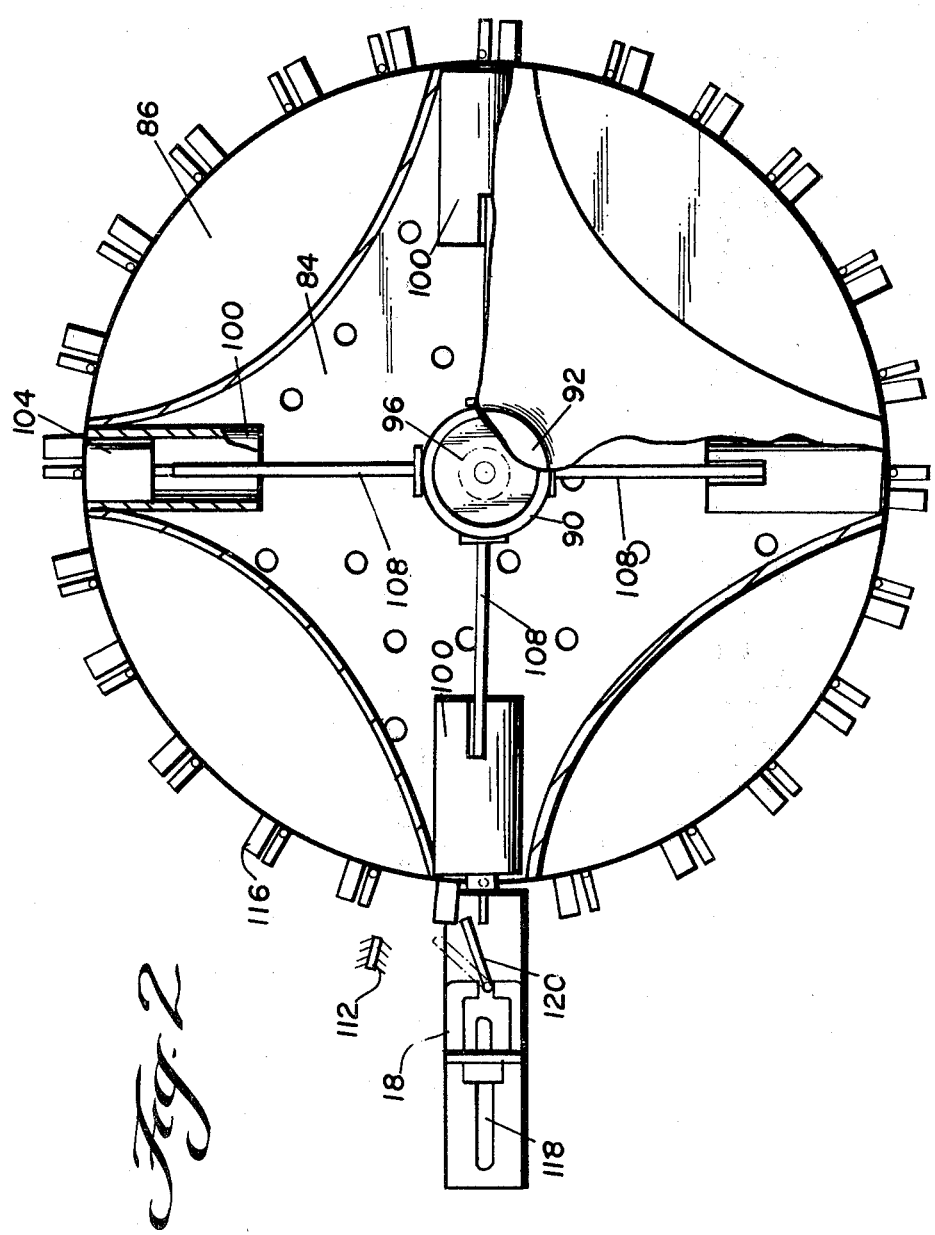

ATMOSPHERIC PRESSURE MOTOR

SUMMARY OF THE INVENTION

A magnet attracts succeeding sites distributed about the periphery of a disk causing the disk to rotate. The resulting centrifugal force pulls radially outwards a plurality of piston-like weights mounted on the disk lowering the pressure within a housing for the weights and in a vacuum tank to which the housing is communicated via a check valve. When the weights are all the way out, they operate a trip which renders the magnet temporarily ineffective. Springs return the weights back toward the center of the disk. The vacuum tank is communicated to an opposed piston engine via timed valves which alternately communicate the engine cylinders to the vacuum, for oscillating the opposed pistons. A crank shaft connected to these pistons converts the reciprocating motion to rotary motion.

The principles of the invention will be further discussed with reference to the drawings wherein a preferred embodiment is shown. The specifics illustrated in the drawings are intended to exemplify, rather than limit, aspects of the invention as defined in the claims.

BRIEF DESCRIPTION OF THE DRAWINGS

In the drawings:

FIG. 1 is a somewhat schematic side elevation view of apparatus provided in accordance with the principles of the present invention with some parts broken away to expose internal details; and FIG. 2 is an enlarged scale fragmentary top plan view of the mechanical lung portion of the device, again with some parts broken away to expose internal details.

DETAILED DESCRIPTION

The atmospheric pressure motor 10 includes three major interconnected parts: a mechanical lung 12, an opposed-piston engine 14 and a vacuum tank 16.

The net effect to be achieved by use of the invention is to convert the power of the magnet 18 to attract angularly succeeding discrete ferromagnetic sites 20 on the rotor 22 of the mechanical lung 12 into rotary motion of the output shaft means 24 of the opposed piston engine, through the intermediacy of using rotation of the rotor 22 of the mechanical lung 12 to produce a vacuum that is used to evacuate the vacuum tank 16. Accordingly, the vacuum tank 16 may be connected by a suction line 28 to the casing 26 of an opposed piston engine 14. The engine 14 is provided with valve means 30 for intermittantly, alternately communicating the suction line 28 to the cylinders 32 of the engine 14 for pulling the pistons 34 back and forth in a reciprocating sense. The pistons 34 are interconnected via wrist pins 36 and connecting rods 38 to a crank shaft 40 that is journalled for rotation in bearings 42. The interior 44 of the casing 26, behind the pistons 34 is continuously vented to the atmosphere via a plurality of openings 46. The crank shaft 40 is connected to the output shaft means 24 to produce the desired corresponding rotation of the latter.

This rotary motion can be used for any purpose, e.g. to power a vehicle, e.g. via a transmission. The only essential connection of the engine 14 to the mechanical lung 12 is via the suction line 28. Accordingly the spatial relationship illustrated in FIGS. 1 and 2 is exempliary.

The casing 26 is shown provided adjacent the exterior of each piston 34 with a respective valve chamber 48. In each chamber 48 a respective, generally cylindrical valve member 50 is journalled in bearings 51 for rotation each about its own longitudinal axis. For timing purposes, each valve member 50 is coaxially provided at a respective end with an individual timing gear 52 mounted thereto, e.g. via a shaft 54. A coordinating timing gear 56 is shown mounted on the crank shaft 40. A timing chain 58 is shown entrained about the gear 56 and the gears 52 in order to preserve the relative angular postioning of the valve members 50.

For each valve chamber 48, the casing 26 is provided with a relief port 60 communicated to the atmosphere and a suction port 62 communicated to the suction line 28. Likewise, each cylinder 32 is provided with a relief port 64 and a suction port 66, respectively separately communicated to the respective valve chamber 48.

Each valve member 50 functions as two valve members that are physically united. Accordingly, one section 68 of each valve member 50 includes a longitudinally long, angularly short slot 70 passing diametrically therethrough. The other section 72 is a hollow cavity 74 and includes an axially long, angularly short inlet slot 76 and a partial-turn helical slot 78, e.g. one having a significant angular extent.

The various slots and ports of each valve means 30 are so located as to provide the following sequence of operation: as the respective piston 34 is in a retracted state, the respective cavity 74 is in a partially evacuated, sub-atmospheric pressure condition (having been pumped out in the previous cycle). Upon sufficient rotation of the valve member 50, the respective cylinder 32 is communicated via the respective suction port 66 and inlet slot 76 to the partial vacuum in the cavity 74, causing the respective piston 34 to be drawn outwards towards the respective slot 66. When this motion is complete, the respective communication is terminated by continued rotation of the valve member 50, causing the respective cylinder 32 to be vented to atmosphere at 64, 70, 60 at the same time that the piston in the opposing cylinder 32 is being communicated to suction. Accordingly, the piston which previously had extended outwards now retracts. Between the times that the respective cylinder is communicated to the respective partially evacuated cavity 74, continued rotation of the respective valve member 50 communicates the respective cavity 74 to the suction line 28 via the respective slot 78 and port 62, thus drawing into the suction line 28 the air which had entered the respective cavity 74 during the immediately preceding time that this cavity was communicated to the respective piston cylinder 32.

The mechanical lung 12 includes a fixed support 80, on which is journalled the rotor 22 in bearings 82 for rotation about its own substantially vertical longitudinal axis.

The rotor includes a ring or disk 84 the outer periphery of which is incorporated into the exterior of a closed housing 86. The disk 84 has a plurality of holes 88 formed through it within the housing to freely communicate the enclosed space above the disk 84 with the enclosed space therebelow. The shaft of the rotor 22 is conveniently provided by a multiply perforated pipe 90 having its free end 92 closed-off and its journalled end 94 communicated via a one-way check-valve 96 to the suction line 28. Thus the enclosed space within the rotor housing is communicated via the perforated pipe 90 to the suction line 28 only in a sense to increase the degree of vacuum in the suction line 28 and thus in the vacuum tank 16.

The rotor 22 is shown further provided with a plurality of (e.g. four) equi-angularly distributed, horizontally radially outwardly directed piston and cylinder arrangements 98, each including a cylinder sleeve 100 mounted on the plate 84 and opening outwardly of the rotor housing at a radially outer end 102. A respective piston 104 is slidingly sealingly received in each cylinder sleeve 100 for reciprocably sliding radially outwardly and radially inwardly of the rotor 22 longitudinal axis.

Each piston 104 is shown connected via an appropriate connector 106 to a respective leaf spring 108 which has its other end connected to the rotor shaft 90 within the housing. The purpose of the leaf springs 108 is to pull the pistons 104 radially inwardly, i.e. back towards the shaft 90 after centrifugal force due to rotation of the rotor 22 has drawn the pistons to their radially outermost extremes in the sleeves 100. Each piston 104 or the rotor housing may be provided with a one-way check valve 110 to atmosphere, for facilitating retraction of the pistons to their radially innermost extremes, e.g. to keep the increased pressure within the rotor housing after air has been drawn from the vacuum line 28 into the enclosed space of the rotor housing from preventing the leaf springs 108 from retracting the pistons 104.

A brake 112 may be provided for relatively stopping rotation of the rotor when the pistons 104 are fully extended and thus, by correspondingly extinguishing the centrifugal force that has drawn-out the pistons, permitting the springs 108 to retract them.

Although other means could be used in addition or instead, I prefer to cause rotation of the rotor 22 with the aid of magnetic force.

In particular, I prefer to provide on the exterior of the rotor, e.g. on the outer periphery of the disk 84 a plurality of equi-angularly distributed, mutually isolated discrete bodies 20 of ferromagnetic material, i.e. material which is not permanently magnetized itself, but which is subject to being attracted to either pole of a magnet.

By preference, each ferromagnetic body is hingedly connected at 114 to the rotor for limited pivotal motion about a respective vertical axis, limited in the leading direction by contact with a respective protuberant stop 116 which also functions to isolate or blind the respective ferromagnetic body from the influence of the magnet 18 as rotation of the rotor carries the respective ferromagnetic body 20 past the magnet 18.

Any convenient means may be used to initiate rotation of the rotor 22. For instance, the rotor may be provided with a ring gear (not shown), with which the gear head (not shown) of a battery-operated starter motor (not shown) may be momentarily connected, much in the way that an automotive gasoline-powered internal combustion engine is electrically cranked in its starting mode.

Once started, the rotor 22 tends to continue to rotate as the permanent magnet 18 attracts the next ferromagnetic body 20, but inertia of the rotating rotor carries that ferromagnetic body angularly past the magnet 18 to an extent such that the distance and the respective protuberant stop 116 isolates that ferromagnetic body 20 from attraction by the magnet 18, which, instead tends to attract the next ferromagnetic body 20 in the endless series.

In order to modulate the speed of rotation of the rotor 22, the magnet 18 may be moved by means 118 radially inwards and outwards, towards and away-from the path of rotation of the series of ferromagnetic bodies 20, and/or some of the magnetic force exerted by the magnet 18 may be diverted from being directed at attracting the succeeding ferromagnetic bodies 20, e.g. by moving a relatively large body of black iron 120 into close adjacency with the poles of the magnet 18.

The brake 112, the means 118 for moving the magnet 18 and/or the means for moving the distractor 120 towards and away from distracting relation with the magnet may be manually operated, and/or may be automatically operated by suitable condition-responsive control means not shown (such as means sensing the rotational speed of the rotor 22, and/or the degree of extension of the pistons 104, and/or the degree of vacuum in the suction line 28).

The atmospheric motor 10 may be made in various sizes depending on the desired power output.

Where the bearing means shown provided at the base of the rotor are insufficient to prevent unwanted oscillation of the free upper end of the rotor, that end may be suitably journalled in bearings as well.

To the extent necessary, the degree of vacuum in the tank 16 may be augmented by connecting the tank to a vacuum pump (not shown) e.g. at an automotive service station, and/or the tank 16 may be removed and replaced with an already more-evacuated like tank.

The engine 14 may be provided with a conventional oil pump (not shown), driving from the timing gear chain for forcing oil from a sump (not shown), through the crank shaft and connecting rods to the piston/cylinder sliding interface in the usual manner.

The atmospheric pressure motor 10, when operated, produces rotation of the output shaft 24, which may be used in a conventional way for any purpose, e.g. to power a vehicle, or an individual wheel or set of wheels of a land vehicle.

The three major portions of the apparatus may be used in various combinations. For instance, a plurality of mechanical lungs can be operated to pump-out a shared vacuum tank, and/or more than one set of two opposed pistons may be run off the same vacuum system, whether housed in a common casing or separately housed, and/or more than one vacuum tank may be provided in the vacuum system.

It should now be apparent that the atmospheric pressure motor as described hereinabove, possesses each of the attributes set forth in the specification under the heading "Summary of the Invention" hereinbefore. Because it can be modified to some extent without departing from the principles thereof as they have been outlined and explained in this specification, the present invention should be understood as encompassing all such modifications as are within the spirit and scope of the following claims.

What is claimed is:

1. An atmospheric pressure engine, comprising:
    at least two opposed pistons slidingly received in casing means including respective cylinders each having means providing a closed chamber in front of the respective piston and being vented to atmosphere to the rear of the respective piston;
    said casing means including valve chamber means for each piston;
    a suction source communicated to each valve chamber means via a suction port, said suction source comprising a vacuum tank communicated to a suction line means that is communicated to the respective said suction ports of said valve chamber means;

vacuum pump means communicated to said suction source for replenishing said suction source by withdrawing air therefrom;

said vacuum pump means being constituted by a mechanical lung, comprising:

a base;

a rotor journalled for rotation on said base about an at least generally vertical axis;

means for rotating the rotor about said axis;

a plurality of equi-angularly distributed weights slidably mounted on the rotor for reciprocation along respective radial paths;

a cylinder mounted on said rotor sleeve for each weight, and sliding by each respective weight piston-fashion, each sleeve having an effectively open radially outer end, and a radially inner end;

means for modulating the rotational speed of said rotor;

mechanical means for retracting each piston upon braking or stopping of the rotor;

housing means sealingly communicated to the radially inner end of each rotor and conduit means connecting the housing means to said suction source, this conduit means incorporating a one-way check valve which opens said conduit means only for sucking air from said suction source, so that as said rotor is rotated with the weights retracted, the weights extend radially outwards in the respective cylinder sleeves due to centrifugal force, thus increasing the volume of, and therefore tending to decrease the pressure in, said housing means, and thus withdrawing air from the suction source, whereupon rotation of the rotor may be slowed or stopped and said mechanical means may be operated to retract the pistons for a next cycle of operation;

a vent port to atmosphere provided to each valve chamber means;

means defining a suction port between each valve chamber means; and the respective said closed chamber;

means defining a vent port between each valve chamber means and the respective said closed chamber;

for each said piston, the respective valve chamber means receiving a first valve member means mounted for movement between a first condition wherein the said vent port of the respective closed chamber and the corresponding said vent port to atmosphere are cut-off from communicating with one another thus isolating the respective closed chamber from atmosphere and a second condition wherein these two vent ports are in communication with one another thus venting the respective closed chamber to atmosphere;

for each said piston, the respective valve chamber means receiving a second valve member means including a cavity, said second valve member means being mounted for movement between a first condition wherein the cavity is communicated to the respective closed chamber via the respective suction port but said cavity is isolated from said suction source, a second condition wherein the cavity is communicated to the suction source via the respective suction port but said cavity is isolated from the respective closed chamber, and a third condition wherein the respective cavity is isolated from both the respective closed chamber and the respective suction source;

for each piston, first means coordinating movement of the respective first and second valve member means to repeatingly provide the following cycle:

that as the respective piston is in a fully retracted condition, and the respective cavity is at least partially evacuated and thus at below-atmospheric pressure, that cavity is communicated to the respective closed chamber causing the respective piston to at least partially extend;

that the respective cavity is then isolated from the respective closed chamber and first communicated to, then isolated from the suction source, in order to again partially evacuate the respective cavity; and that after the respective piston has extended, the respective closed chamber is vented to atmosphere and then isolated therefrom;

second means coordinating the movement of the respective first and second valve member means for all of said at least two pistons to provide an even distribution of phases of operation at least so that for each two mutually opposed pistons, one is being caused to retract as the other is being caused to extend;

a crank shaft means journalled for rotation;

connecting arm means joining each piston to the crank shaft means so that coordinated reciprocation of said pistons produces rotation of said crank shaft means; and rotary power take-off means connected to said crank shaft means to receive rotary power therefrom.

2. The atmospheric pressure engine of claim 1, wherein:

for each piston, the respective first and second valve member means and the respective first coordinating means are constituted by a unitary rotary valve member.

3. The atmospheric pressure engine of claim 2, wherein:

as said second coordinating means, the crank shaft is provided with a coordinating timing gear and each unitary rotary valve member is provided with a timing gear, there being endless timing chain means entrained about all these timing gears to rotate said valve members and provide said even distribution of phases of operation.

4. The atmospheric pressure engine of claim 1, wherein:

the means for rotating the rotor comprises:

a plurality of isolated bodies of ferromagnetic material disposed in a circumferential ring fixed externally on the rotor; and magnetic means for successively attracting said isolated bodies.

5. The atmospheric pressure engine of claim 4, wherein:

the magnetic means is constituted by a permanent magnet and means stationing that magnet at a site in proximity to said ring.

6. The atmospheric pressure engine of claim 5, wherein said means for modulating the rotational speed of said rotor includes means for moving said magnet relative to said ring.

7. The atmospheric pressure engine of claim 5, including:

ferromagnetic means movably interposable between said magnet and said ring for adjustably modulating the capability of the magnet to rotate the rotor.

* * * * *